(12) United States Patent
Fukuda

(10) Patent No.: US 10,735,622 B2
(45) Date of Patent: Aug. 4, 2020

(54) IMAGE FORMING APPARATUS AND STORAGE MEDIUM FOR CONTROLLING OF DOCUMENT DATA FOR MAINTENANCE OF THE IMAGE FORMING APPARATUS

(71) Applicant: CANON KABUSHIKI KAISHA, Tokyo (JP)

(72) Inventor: Shin Fukuda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 6 days.

(21) Appl. No.: 15/382,386

(22) Filed: Dec. 16, 2016

(65) Prior Publication Data

US 2017/0180592 A1    Jun. 22, 2017

(30) Foreign Application Priority Data

Dec. 21, 2015 (JP) ................. 2015-249066

(51) Int. Cl.
| | |
|---|---|
| *H04N 1/00* | (2006.01) |
| *G06K 15/00* | (2006.01) |
| *H04N 1/32* | (2006.01) |
| *G06K 9/00* | (2006.01) |
| *G06K 15/02* | (2006.01) |

(52) U.S. Cl.
CPC ..... *H04N 1/32122* (2013.01); *G06K 9/00469* (2013.01); *G06K 15/1836* (2013.01); *H04N 1/00411* (2013.01); *H04N 1/00464* (2013.01); *G06K 2209/01* (2013.01); *H04N 2201/0094* (2013.01); *H04N 2201/3205* (2013.01); *H04N 2201/3274* (2013.01)

(58) Field of Classification Search
CPC .......... H04N 1/32122; H04N 1/00464; H04N 2201/0094; H04N 2201/3205; H04N 2201/3274; H04N 1/00344; H04N 1/00411; G06K 15/1836; G06K 9/00469; G06K 2209/01; G03F 9/7096; G03G 15/2035; G03G 21/16

See application file for complete search history.

(56) References Cited

U.S. PATENT DOCUMENTS

| | | | | |
|---|---|---|---|---|
| 6,903,831 | B1* | 6/2005 | Rapke-Kraft | ....... B41F 33/0009 358/1.13 |
| 7,934,148 | B2* | 4/2011 | Bobo, II | .............. H04N 1/4413 358/402 |
| 8,433,719 | B1* | 4/2013 | Choc | ................. G06F 17/30899 707/705 |

(Continued)

FOREIGN PATENT DOCUMENTS

JP     2007-206999 A     8/2007

*Primary Examiner* — Juan M Guillermety
(74) *Attorney, Agent, or Firm* — Canon U.S.A., Inc. IP Division

(57) ABSTRACT

An apparatus includes a storage unit configured to store document data used to perform maintenance of the apparatus, a determination unit configured to determine a search range, in which data designated by a search instruction in the stored document data is to be searched for, based on configuration information, a detection unit configured to detect the data included in the search range and designated by the search instruction in the stored document data, and a display control unit configured to display a detection result of the detection unit on a display unit.

12 Claims, 12 Drawing Sheets

(56) References Cited

U.S. PATENT DOCUMENTS

| | | | |
|---|---|---|---|
| 2003/0046033 A1* | 3/2003 | Chang | G05B 19/0428 |
| | | | 702/188 |
| 2008/0294423 A1* | 11/2008 | Castellani | G06F 11/0733 |
| | | | 704/4 |
| 2009/0148179 A1* | 6/2009 | Tamura | G03G 21/1619 |
| | | | 399/107 |
| 2014/0204408 A1* | 7/2014 | Iwashima | H04N 1/00344 |
| | | | 358/1.14 |
| 2015/0127491 A1* | 5/2015 | Duggar | G06F 17/30864 |
| | | | 705/26.62 |
| 2015/0138589 A1* | 5/2015 | Minagawa | G06F 3/1205 |
| | | | 358/1.14 |
| 2015/0142437 A1* | 5/2015 | Kobayashi | G06F 3/167 |
| | | | 704/246 |
| 2015/0331568 A1* | 11/2015 | Amano | G06F 3/0484 |
| | | | 707/772 |
| 2016/0063059 A1* | 3/2016 | Krauss | G06F 17/30457 |
| | | | 707/767 |
| 2016/0239569 A1* | 8/2016 | Levy | G06F 17/30864 |
| 2017/0046339 A1* | 2/2017 | Bhat | G06F 17/30026 |
| 2017/0185611 A1* | 6/2017 | Hurwitz | G06F 17/30864 |
| 2017/0192725 A1* | 7/2017 | Choi | G06F 3/1238 |

\* cited by examiner

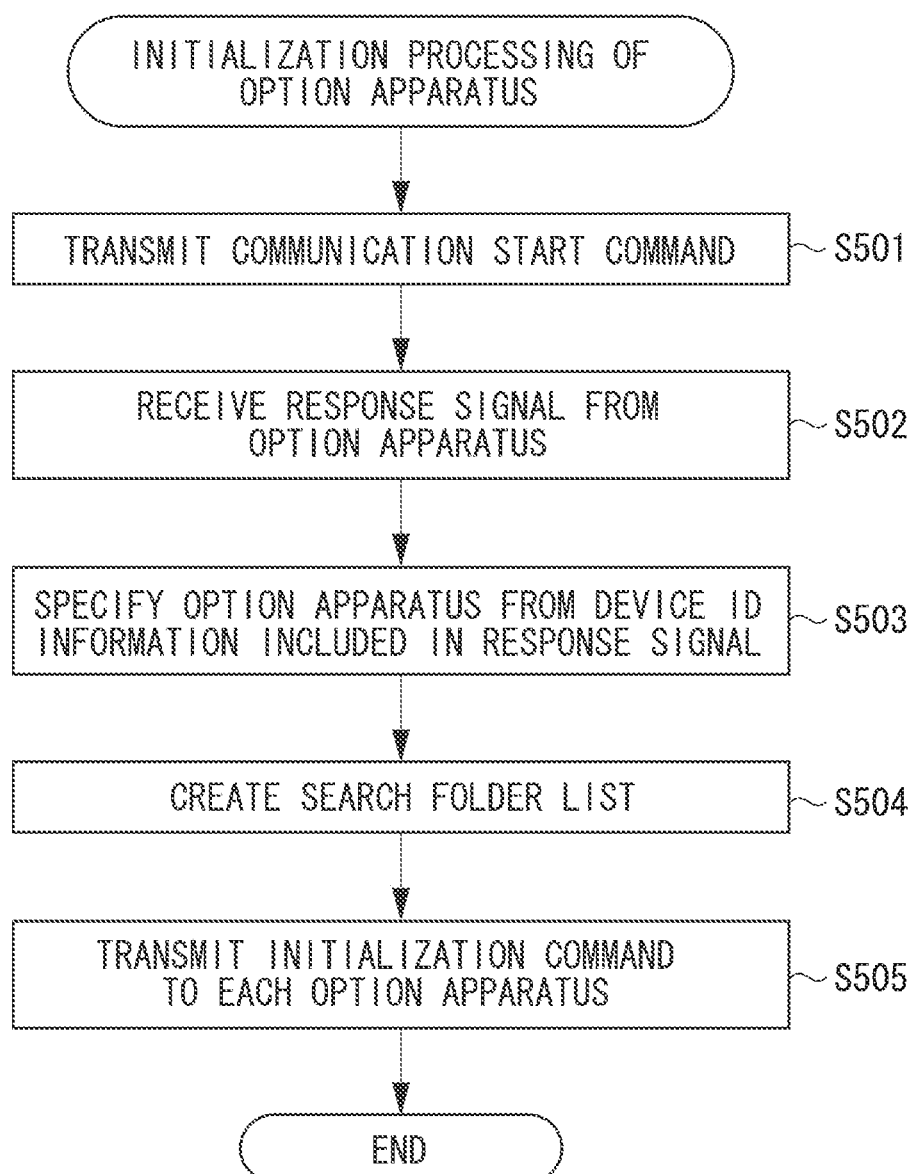

```
<?xml version = "1.0" encoding = "Shift_JIS"?>

<search_folder>
        <path>SERVICE MANUAL/PRINTING APPARATUS 102</path>
        <path>SERVICE MANUAL/OPTION APPARATUS A</path>
        <path>SERVICE MANUAL/OPTION APPARATUS B</path>
        <path>SERVICE MANUAL/OPTION APPARATUS C</path>
        <path>SERVICE MANUAL/OPTION APPARATUS D</path>
        <path>INSTALLATION PROCEDURE MANUAL/PRINTING APPARATUS 102</path>
        <path>INSTALLATION PROCEDURE MANUAL/OPTION APPARATUS A</path>
        <path>INSTALLATION PROCEDURE MANUAL/OPTION APPARATUS B</path>
        <path>INSTALLATION PROCEDURE MANUAL/OPTION APPARATUS C</path>
        <path>INSTALLATION PROCEDURE MANUAL/OPTION APPARATUS D</path>
        <path>PARTS CATALOG/PRINTING APPARATUS 102</path>
        <path>PARTS CATALOG/OPTION APPARATUS A</path>
        <path>PARTS CATALOG/OPTION APPARATUS B</path>
        <path>PARTS CATALOG/OPTION APPARATUS C</path>
        <path>PARTS CATALOG/OPTION APPARATUS D</path>
        <path>CIRCUIT DIAGRAM/PRINTING APPARATUS 102</path>
        <path>CIRCUIT DIAGRAM/OPTION APPARATUS A</path>
        <path>CIRCUIT DIAGRAM/OPTION APPARATUS B</path>
        <path>CIRCUIT DIAGRAM/OPTION APPARATUS C</path>
        <path>CIRCUIT DIAGRAM/OPTION APPARATUS D</path>
</search_folder>
```

601

```
<?xml version = "1.0" encoding = "Shift_JIS"?>

<search_folder>
        <path>SERVICE MANUAL/PRINTING PRINTING APPARATUS 102</path>
        <path>SERVICE MANUAL/OPTION APPARATUS A</path>
        <path>SERVICE MANUAL/OPTION APPARATUS D</path>
        <path>INSTALLATION PROCEDURE MANUAL/APPARATUS 102</path>
        <path>INSTALLATION PROCEDURE MANUAL/OPTION APPARATUS A</path>
        <path>INSTALLATION PROCEDURE MANUAL/OPTION APPARATUS D</path>
        <path>PARTS CATALOG/PRINTING APPARATUS 102</path>
        <path>PARTS CATALOG/OPTION APPARATUS A</path>
        <path>PARTS CATALOG/OPTION APPARATUS D</path>
        <path>CIRCUIT DIAGRAM/PRINTING APPARATUS 102</path>
        <path>CIRCUIT DIAGRAM/OPTION APPARATUS A</path>
        <path>CIRCUIT DIAGRAM/OPTION APPARATUS D</path>
</search_folder>
```

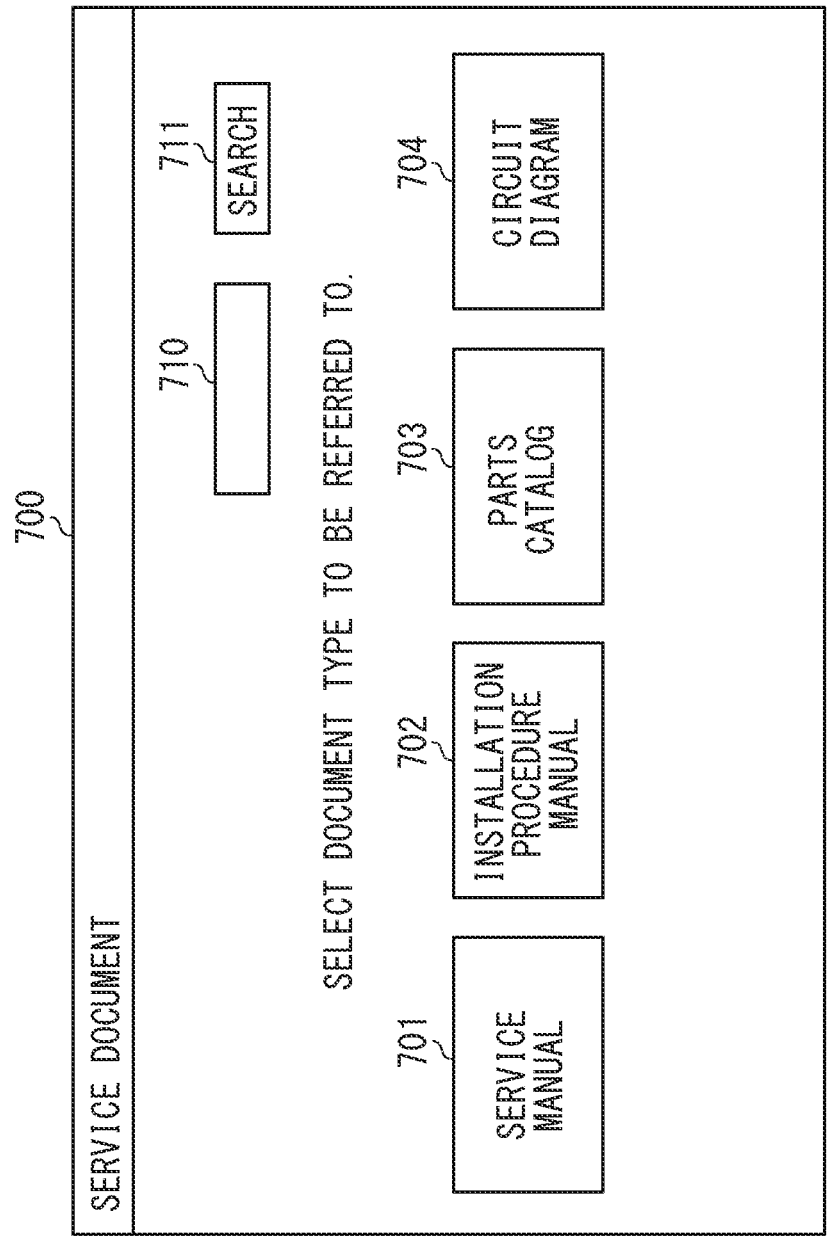

FIG. 9

SERVICE DOCUMENT — 900

[SEARCH] [DRUM CLEANING] — 910

| 911 FOLDER NAME | 912 DOCUMENT NAME | 913 HIT PORTION |
|---|---|---|
| SERVICE MANUAL/ PRINTING APPARATUS 102 | MAIN BODY SPECIFICATION | SHEET FEEDING METHOD:AIR SEPARATION METHOD DRUM CLEANING METHOD:CLEANING BLADE TRANSFER CLEANING METHOD:CLEANING BLADE |
| SERVICE MANUAL/ PRINTING APPARATUS 102 | PRINT PROCESS | REMOVE DRUM MEMORY ON SURFACE OF PHOTOSENSITIVE DRUM BY IRRADIATING DRUM WITH LIGHT OF EXPOSURE LED BEFORE DRUM CLEANING, TO PREVENT DIRT ON PHOTOSENSITIVE DRUM. |
| SERVICE MANUAL/ PRINTING APPARATUS 102 | PERIODIC CLEANING PORTION | REMOVE DRUM CLEANING UNIT 〈PRELIMINARY PREPARATION〉 1) OPEN FRONT LEFT COVER AND FRONT RIGHT COVER. 2) REMOVE PROCESS UNIT COVER. 3) REMOVE PRIMARY CHARGING UNIT. 4) DRAW PROCESS UNIT. |
| SERVICE MANUAL/ PRINTING APPARATUS 102 | SERVICE MENU | DRM-IDL REMOVE RESIDUAL TONER ON DRUM IDLE PHOTOSENSITIVE DRUM, TO REMOVE RESIDUAL TONER ON DRUM. IN THIS CASE, MAGNET ROLLER FOR DRUM CLEANING IS STOPPED. PHOTOSENSITIVE MEMBER MAY BE SHAVED BECAUSE TONER IS NOT SUPPLIED TO CLEANING BLADE. |
| PARTS CATALOG/ PRINTING APPARATUS 102 | PHOTOSENSITIVE DRUM | DRUM CLEANING BLADE PART NUMBER:PM1-4567, MEASURE OF DURABILITY:1,000,000 SHEETS REVERSE BLADE WHEN NUMBER OF SHEETS IS 500,000. REPLACE WHEN NUMBER OF SHEETS IS 1,000,000. |

| LICENSE FUNCTION NAME (1001) | LICENSE ID (1002) | VALIDATION STATUS (1003) |
|---|---|---|
| FAX TRANSMISSION AND RECEPTION | FAX | INVALID |
| SCHEDULER | SCHEDULER | VALID |
| PDF DIRECT PRINT | PDF_PRINT | VALID |
| JAPANESE FONT | JAPANESE_FONT | INVALID |
| OCR SCAN | OCR_SCAN | INVALID |
| TRANSACTION PRINT | TRANSACTION | INVALID |
| ... | ... | ... |

```
<!DOCTYPE HTML PUBLIC"-//W3C//DTD HTML 4.01 Transitional//EN">
<head>
<meta name = "licenseID" content = "FAX">
<title>METHOD FOR USING FAX FUNCTION</title>
</head>
<body>
<div id = "id_content">
<div class = "h1"><a id = "c54c0f196858a6131dafde360642102e"></a>FAX TRANSMITTION AND RECEIVING IN MAIN BODY</div>
<div class = "text">USE OF FAX IS BEING DESCRIBED.</div>
<div class = "text">FOR USE OF l FAX,<A href =
"1T0002910072.html#4fc3efe148a9f0a0bc339a910515c4f8">REFER TO "SCAN AND TRANSMIT" </a>.    WHEN FAX
TRANSMISSION IS TO BE PERFORMED BY "SCAN AND TRANSMIT", PREVIOUSLY SET [DISPLAY OF FAX FUNCTION] TO "ON",
AND SET FAX DISPLAY IN "SCAN AND TRANSMIT" TO "ON".<div>
</div>
</body>
```

US 10,735,622 B2

IMAGE FORMING APPARATUS AND STORAGE MEDIUM FOR CONTROLLING OF DOCUMENT DATA FOR MAINTENANCE OF THE IMAGE FORMING APPARATUS

BACKGROUND OF THE INVENTION

Field of the Invention

The aspect of the embodiments relates to a display control technique of document data used for maintenance of an image forming apparatus.

Description of the Related Art

In recent years, documents (an operation manual, a service manual, etc.) required when an information processing apparatus such as a printing apparatus is operated or maintained are respectively provided as electronic documents to enhance portability and searchability. Generally, the electronic documents are provided to an operator or a service person in a state of being recorded on storage media, or using a method such as downloading the documents via the Internet.

The operator or the service person causes the information processing apparatus to perform search processing for data satisfying a predetermined condition in the electronic document. For example, the operator or the service person inputs a keyword into the information processing apparatus, and causes the information processing apparatus to detect data including the keyword from the electronic document. Thus, the operator or the service person can browse, among data included in the electronic document, the data in a desired portion.

Japanese Patent Application Laid-Open No. 2007-206999 discusses a system enabling a printing apparatus having a web server function to retain an electronic document and to refer to the electronic document from a web browser in a personal computer (PC) or a printing apparatus installed at a customer.

The system discussed in Japanese Patent Application Laid-Open No. 2007-206999, an electronic document such as an operation manual or a service manual is also provided for an option apparatus connected to the printing apparatus.

The system discussed in Japanese Patent Application Laid-Open No. 2007-206999, a mechanism for detecting data in an item desired by a user in the electronic document such as the operation manual or the service manual has not been studied.

When search processing is performed for all of the prepared electronic document such as the operation manual or the service manual, like in the above described conventional technique, a long time may be required to perform the search processing, and a processing load for performing the search processing is increased.

SUMMARY OF THE INVENTION

According to an aspect of the embodiments, an image forming apparatus includes a storage unit that stores document data used to perform maintenance of the image forming apparatus, a memory device that stores a set of instructions, and at least one processor that executes the instructions to acquire configuration information representing a configuration of the image forming apparatus, receive an instruction to search for data satisfying a predetermined condition in the document data stored in the storage unit, determine a search range, in which the data satisfying the predetermined condition designated by the search instruction in the document data stored in the storage unit is to be searched for, based on the configuration information, detect the data included in the determined search range and satisfying the predetermined condition designated by the search instruction in the document data stored in the storage unit, and display a detection result on a display unit.

Further features of the disclosure will become apparent from the following description of exemplary embodiments with reference to the attached drawings.

BRIEF DESCRIPTION OF THE DRAWINGS

FIG. 5 is a flowchart illustrating communication initialization processing of a printing apparatus according to the first exemplary embodiment.

FIG. 6 illustrates an example of a search folder list according to the first exemplary embodiment.

FIG. 7 illustrates an example of a screen displayed on a web browser according to the first exemplary embodiment.

FIG. 9 is an example of a web page illustrating a detection result according to the first exemplary embodiment.

FIG. 10 illustrates a table for managing a validation status of a license according to a second exemplary embodiment.

FIG. 11 illustrates an example of a HyperText Markup Language (HTML) document corresponding to a license function according to the second exemplary embodiment.

DESCRIPTION OF THE EMBODIMENTS

Exemplary embodiments for implementing the disclosure will be described below with reference to the drawings.

In a first exemplary embodiment, a printing system in which an image processing controller referred to as a digital front end (DFE) is connected to a printing apparatus (image forming apparatus) will be described.

Figure 1:
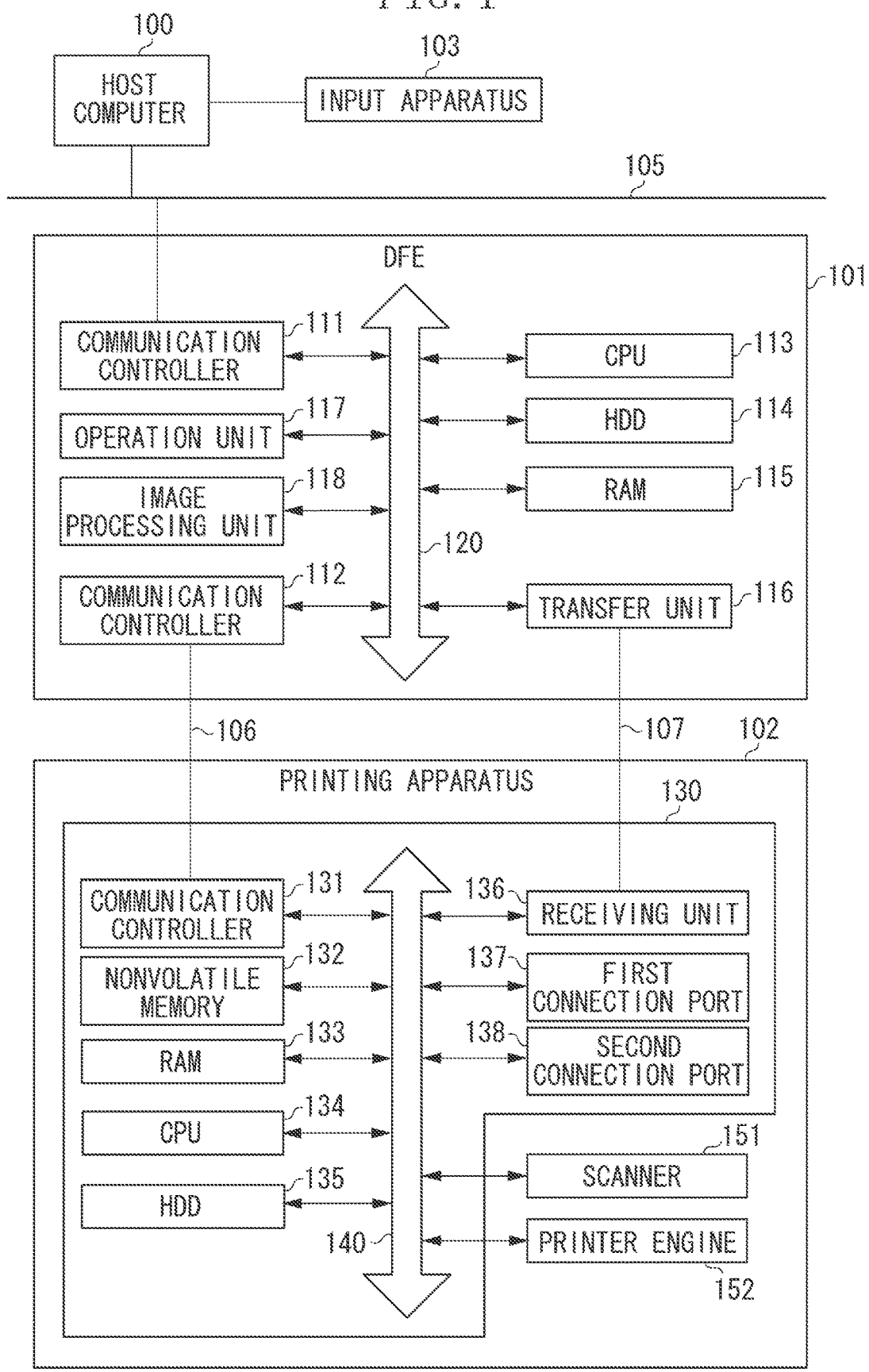
FIG. 1 is a block diagram illustrating an example of a hardware configuration of a printing system according to a first exemplary embodiment.

FIG. 1 illustrates an example of a hardware configuration of the printing system according to the present exemplary embodiment. In an example illustrated in FIG. 1, a host computer 100 and a DFE 101 are connected to each other via a network 105. In the present exemplary embodiment, the DFE 101 and a printing apparatus 102 are connected to each other via a network 106 and a line 107.

Examples of the networks 105 and 106 include a local area network (LAN) and a wide area network (WAN). Whether the network is of wired or of wireless, the type of the network, and a communication protocol used for communication are not particularly limited. The number of apparatuses (host computers 100, DFEs 101, or printing apparatuses 102) connected to the network 105 or the network 106 is not particularly limited.

The line 107 is used to transmit image data generated by the DFE 101 to the printing apparatus 102. However, the image data generated by the DFE 101 may be transmitted to the printing apparatus 102 from the DFE 101 via the network 106 without using the line 107.

The host computer 100 inputs printing information to the DFE 101 and the printing apparatus 102. The host computer 100 acquires printing information from an input device 103. An example of the input device 103 may be a keyboard, a mouse, or a touch panel.

The host computer 100 creates a print job to be transmitted to the DFE 101 based on the input printing information, and transmits the created print job to the DFE 101. The print job includes printing information for causing the printing apparatus 102 to perform printing.

The DFE 101 performs processing for interpreting the printing information included in the print job input from the host computer 100 and generating image data printable by the printing apparatus 102 (hereinbelow, referred to as Raster Image Processor (RIP) processing). The DFE 101 outputs the image data, which has been generated by the RIP processing, to the printing apparatus 102. A configuration of the DFE 101 will be described below with reference to FIG. 1.

A communication controller 111 performs control for the DFE 101 to communicate with the host computer 100 via the network 105. The communication controller 111 performs processing for receiving the print job from the host computer 100.

An image processing unit 118 performs the above-described RIP processing. The image processing unit 118, for example, interprets printing information described using a predetermined print processing language to generate image data. Processing performed by the image processing unit 118 may be implemented by software to be executed by a central processing unit (CPU) 113 (described below).

A transfer unit 116 transfers the image data, which has been generated by the image processing unit 118, to the printing apparatus 102 via the line 107. A communication controller 112 performs communication processing with the printing apparatus 102 via the network 106.

In the present exemplary embodiment, the image data generated by the RIP processing is transferred via a dedicated line (line 107) having a large transfer band because the data size thereof is large. However, the image data, which has been generated by the RIP processing, may be transferred to the printing apparatus 102 via the network 106.

The CPU 113 loads a program held in a hard disk drive (HDD) 114 into a random access memory (RAM) 115 and executes the loaded program. The CPU 113 integrally controls components in the DFE 101. The program may be held in a read only memory (ROM) (not illustrated).

The HDD 114 holds the image data, which has been generated by the RIP processing, and various types of setting data on a temporary or long-term basis. The image data, which has been generated by the image processing unit 118, is recorded once on the HDD 114. The RAM 115 functions as a work memory during execution of various types of programs.

The operation unit 117 inputs an operation instruction with respect to the DFE 101. In the present exemplary embodiment, the operation unit 117 includes a display serving as a display device. An example of the operation unit 117 can be a touch panel display. Alternatively, the operation unit 117 may include an operation button used to operate the DFE 101. While an example in which the operation unit 117 is provided in the DFE 101 has been described in the example illustrated in FIG. 1, the aspect of the embodiments is not limited to this. The operation unit 117 may be provided outside the DFE 101 and connected to the DFE 101.

The components in the DFE 101 are connected to one another via a bus 120.

A configuration of the printing apparatus 102 will be described below with reference to FIG. 1. In the present exemplary embodiment, a case where the printing apparatus 102 is a multifunction peripheral having not only a printing function but also a scanning function will be described. A controller board 130 controls a scanner 151 and a printer engine 152. Each of components included in the controller board 130 will be described below.

The communication controller 131 performs communication processing with the DFE 101 via the network 106. The communication controller 131 performs control for receiving information representing the print job, which has been input to the DFE 101, from the DFE 101. In the present exemplary embodiment, the communication controller 131 receives from the DFE 101 a search instruction for a keyword in an electronic document (document data) 410 stored in a HDD 135. The form of receiving the search instruction is not limited to receiving a search instruction for data including an input keyword. For example, an instruction to search for data including an image matching with or similar to an image input at the time of the search instruction may be received. Alternatively, data corresponding to a voice, which has been input as a search instruction, may be detected. The content of a search instruction may be an instruction to detect data satisfying a predetermined condition in the electronic document 410 held by the printing apparatus 102. An example in which a keyword is input to the printing apparatus 102 as a search instruction will be described below.

The communication controller 131 performs communication control for transmitting the electronic document 410 stored in the HDD 135 and used to perform maintenance of the printing apparatus 102, to the DFE 101 via the network 106. Details of the electronic document 410 will be described below with reference to FIG. 4.

A receiving unit 136 receives the image data, which has been transferred from the DFE 101, via the line 107. The image data received by the receiving unit 136 is image data generated by the RIP processing in the DFE 101. The image data, which has been transferred from the DFE 101, is stored once in the RAM 133 after being compressed, and is then stored in the HDD 135.

A first connection port 137 is a connection port for connecting an option apparatus positioned upstream of the printing apparatus 102 in a sheet conveyance direction of the printing apparatus 102. More specifically, the first connection port 137 is a connection port for connecting, before the printing apparatus 102 performs print processing using a sheet, an apparatus for performing sheet feeding processing on the sheet. Examples of the option apparatus connected to the first connection port 137 include a sheet feeding apparatus.

A second connection port 138 is a connection port for connecting an option apparatus positioned downstream of the printing apparatus 102 in the sheet conveyance direction of the printing apparatus 102. More specifically, the second connection port 138 is a connection port for connecting, after the printing apparatus 102 performs print processing using a sheet, an apparatus for performing bookbinding processing on the sheets. Examples of the option apparatus connected to the second connection port 138 include a loading apparatus that loads printed sheets, and a processing apparatus that performs punching, folding, and bookbinding.

The first connection port 137 and the second connection port 138 acquire identification information for identifying the types of the option apparatuses connected to the printing apparatus 102 as configuration information from the option apparatuses. The identification information is acquired, for example, at the time of startup of the printing apparatus 102. Details of the acquisition processing of the identification information will be described below with reference to FIG. 5.

The printing apparatus 102 can serially connect (daisy-chain connection) a plurality of option apparatuses. The connection to the option apparatuses will be described below with reference to FIG. 2.

A nonvolatile memory 132 is a nonvolatile storage device, and stores a control program to be used by the printing apparatus 102 at the time of startup. A RAM 133 is used as a work area for a CPU 134 to execute a control program for the printing apparatus 102. The CPU 134 executes the control program, which has been read out to the RAM 133, to integrally control an image signal and various types of devices.

The HDD 135 holds the image data and the various types of setting data on a temporary or long-term basis. A part of or the whole of the control program may be stored in the HDD 135. The HDD 135 stores the electronic document 410 used to perform maintenance of the printing apparatus 102. In the present exemplary embodiment, the electronic document 410 is a web document, and can be browsed using a web browser from the DFE 101 connected to the printing apparatus 102 via the network 106. Details of the electronic document 410 will be described below with reference to FIG. 4.

The scanner 151 scans an original document using an optical sensor, and generates scanned image data. The printer engine 152 prints the image data on a print sheet. Components in the printing apparatus 102 illustrated in FIG. 1 are connected to one another via a system bus 140.

Figure 2:
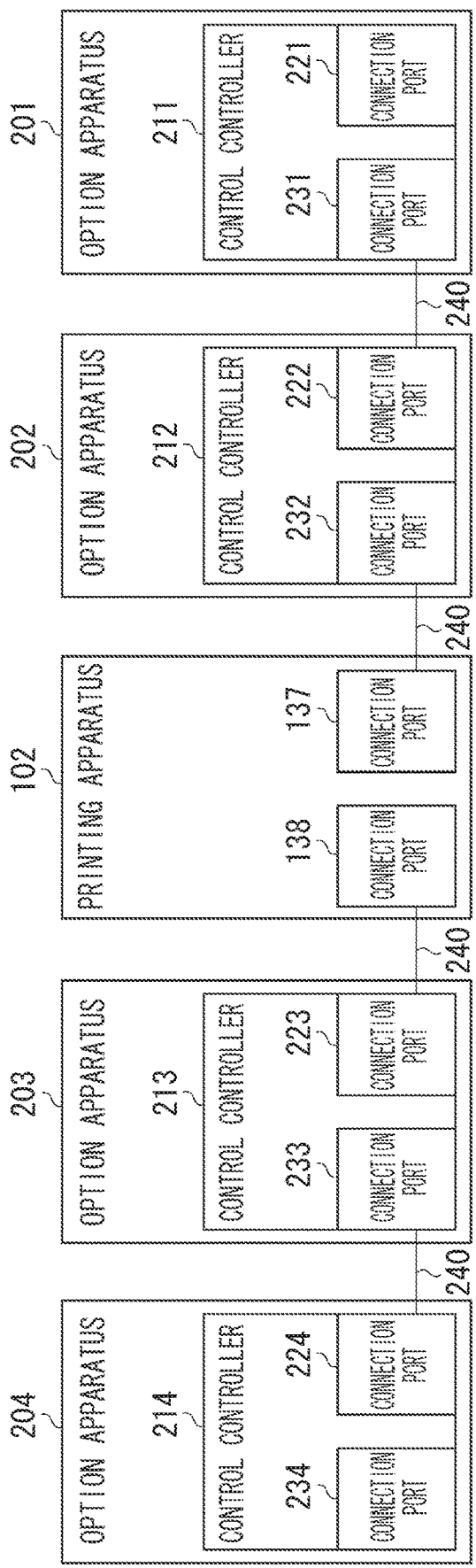
FIG. 2 is a block diagram illustrating a connection example of a printing apparatus and option apparatuses according to the first exemplary embodiment.

Next, connection between the printing apparatus 102 and the option apparatuses will be described below with reference to FIG. 2. FIG. 2 illustrates an example in which option apparatuses 201 to 204 are connected to the printing apparatus 102. The sheet conveyance direction of the printing apparatus 102 is from the left to the right in FIG. 2.

The option apparatus 201 and the option apparatus 202 are connected to the upstream side of the printing apparatus 102. Examples of the option apparatuses 201 and 202 connected to the upstream side of the printing apparatus 102 include a sheet feeding apparatus that can hold a large number of sheets, a sheet feeding apparatus that can feed a special sheet such as a long sheet, and a sheet feeding apparatus that can cut a roll sheet and feed it.

The option apparatus 203 and the option apparatus 204 are connected to the downstream side of the printing apparatus 102. Examples of the option apparatuses 203 and 204 connected to the downstream side of the printing apparatus 102 include a loading apparatus that can load printed sheets, and a processing apparatus that can perform punching, folding, and bookbinding. The option apparatuses 201 to 204 respectively include control controllers 211 to 214 for controlling the option apparatuses themselves. The control controllers 211 to 214 respectively include connection ports 221 to 224 and connection ports 231 to 234. The connection port in each of the option apparatuses is used to connect to another option apparatus positioned upstream of or downstream of the option apparatus itself or the printing apparatus 102.

Each of the option apparatuses 201 to 204 and the printing apparatus 102 is connected to the apparatus adjacent thereto via a communication cable 240. In this configuration, the printing apparatus 102 is able to communicate to all the option apparatuses 201 to 204. While an example in which the two option apparatuses are connected to each of the upstream side and the downstream side of the printing apparatus 102 has been illustrated, option apparatuses can also be r connected to the upstream side of the option apparatus 201 and the downstream side of the option apparatus 204.

Figure 3:
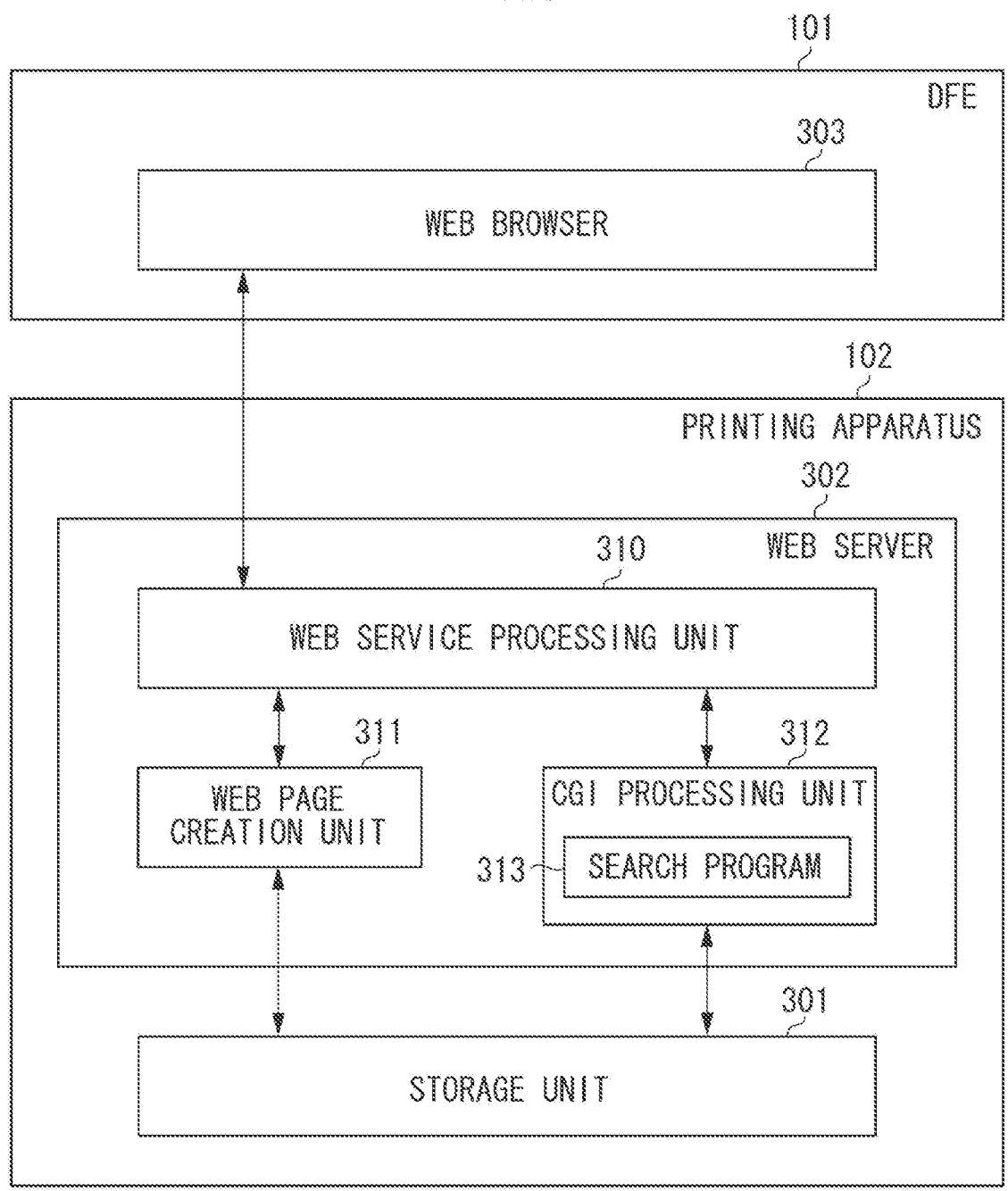
FIG. 3 is a block diagram illustrating an example of a functional configuration for creating and displaying an electronic document according to the first exemplary embodiment.

The function of the printing system and the flow of data in the present exemplary embodiment will be described below with reference to FIG. 3.

The function of the printing apparatus 102 will be described below. A storage unit 301 stores the electronic document 410. The electronic document 410 includes information representing an operation procedure of the printing apparatus 102 and link information to a tool used to perform maintenance of the printing apparatus 102.

The storage unit 301 is implemented, for example, by the HDD 135. In the present exemplary embodiment, the electronic document 410 can be a HyperText Markup Language (HTML) document. Details of a configuration of the electronic document 410 will be specifically described below with reference to FIG. 4.

The printing apparatus 102 further includes a web server 302. The web server 302 provides a function of enabling the electronic document 410 stored in the storage unit 301 to be referred to from outside of the printing apparatus 102. The web server 302 is implemented by the CPU 134 executing a control program.

The web server 302 includes a web service processing unit 310, a web page creation unit 311, and a Common Gateway Interface (CGI) processing unit 312. CGI is a mechanism for starting up a program held in the web server 302 in response to a request from a web browser 303.

The web service processing unit 310 receives a request message from the web browser 303 in the DFE 101. A web application service to be provided to the DFE 101 in response to the request message is determined.

The web service processing unit 310 receives, for example, a Uniform Resource Locator (URL) and a parameter as the request message. The web service processing unit 310 performs processing corresponding to the received URL and parameter, and returns a web page to the web browser 303 as a response to the request message.

The web page creation unit 311 functions by being called from the web service processing unit 310. The web page creation unit 311 creates a web page screen corresponding to the request designated from the web browser 303.

For example, the web page creation unit 311 reads out, when a request to display the electronic document 410 has been issued from the web browser 303, a corresponding portion of the HTML document from the electronic document 410, forms a web page screen, and transmits the formed web page screen to the web browser 303.

The CGI processing unit 312 functions by being called from the web service processing unit 310. The CGI processing unit 312 executes a corresponding CGI program based on the request from the web browser 303, constructs a result using HTML, and returns the result to the web service processing unit 310. In the present exemplary embodiment, the CGI program includes at least a search program 313. The search program 313 is a CGI program for acquiring a keyword from a parameter included in a request message requested from the web browser 303, searching the electronic document 410 using a keyword, and constructing a search result (detection result) using HTML.

Next, the DFE 101 will be described. The web browser 303 provides a function of being provided with various types of web services from the web server 302. The web browser 303 transmits the request message to the web server 302, receives a web page from the web server 302 as a response to the request, and displays the received web page on the operation unit 117 serving as a display unit. For example, the web browser 303 displays the electronic document 410 stored in the storage unit 301 in the printing apparatus 102 on the operation unit 117. In the present exemplary embodiment, the web browser 303 is implemented by the CPU 113 executing the control program.

Next, an example of a configuration of the electronic document 410 stored in the HDD 135 in the printing apparatus 102 will be described below with reference to a schematic view of FIG. 4. The electronic document 410 includes HTML document groups classified with a directory (hereinbelow, referred to as a folder) having a hierarchical structure.

A first folder hierarchy is divided into folders by document type. The document type includes four document types, i.e., a "service manual", an "installation procedure manual", a "parts catalog", and a "circuit diagram". For example, the "service manual" is stored in a folder 401, the "installation procedure manual" is stored in a folder 402, the "parts catalog" is stored in a folder 403, and the "circuit diagram" is stored in a folder 404.

Thus, the electronic document 410 includes a plurality of document data of different types. The "service manual" is used by a service person (user) to confirm a procedure for maintaining the printing apparatus 102. The "installation procedure manual" is used by the service person to confirm a procedure for installing the printing apparatus 102. The "parts catalog" is used by the service person to confirm information about parts in the printing apparatus 102. The "circuit diagram" is used for confirming a circuit included in the printing apparatus 102.

A second folder hierarchy is divided into folders for each apparatus. In an example of FIG. 4, a folder 411 included in the folder 401 stores a service manual (HTML document group) corresponding to the printing apparatus 102. Folders 412 to 415 included in the folder 401 respectively store service manuals (HTML document groups) corresponding to option apparatuses A to D.

Each of respective contents of the folder 402, the folder 403, and the folder 404 is divided into folders by apparatus, similar to that of the folder 401. Each of the folders in the second folder hierarchy (and subsequent hierarchies) stores actual HTML documents.

Figure 4:
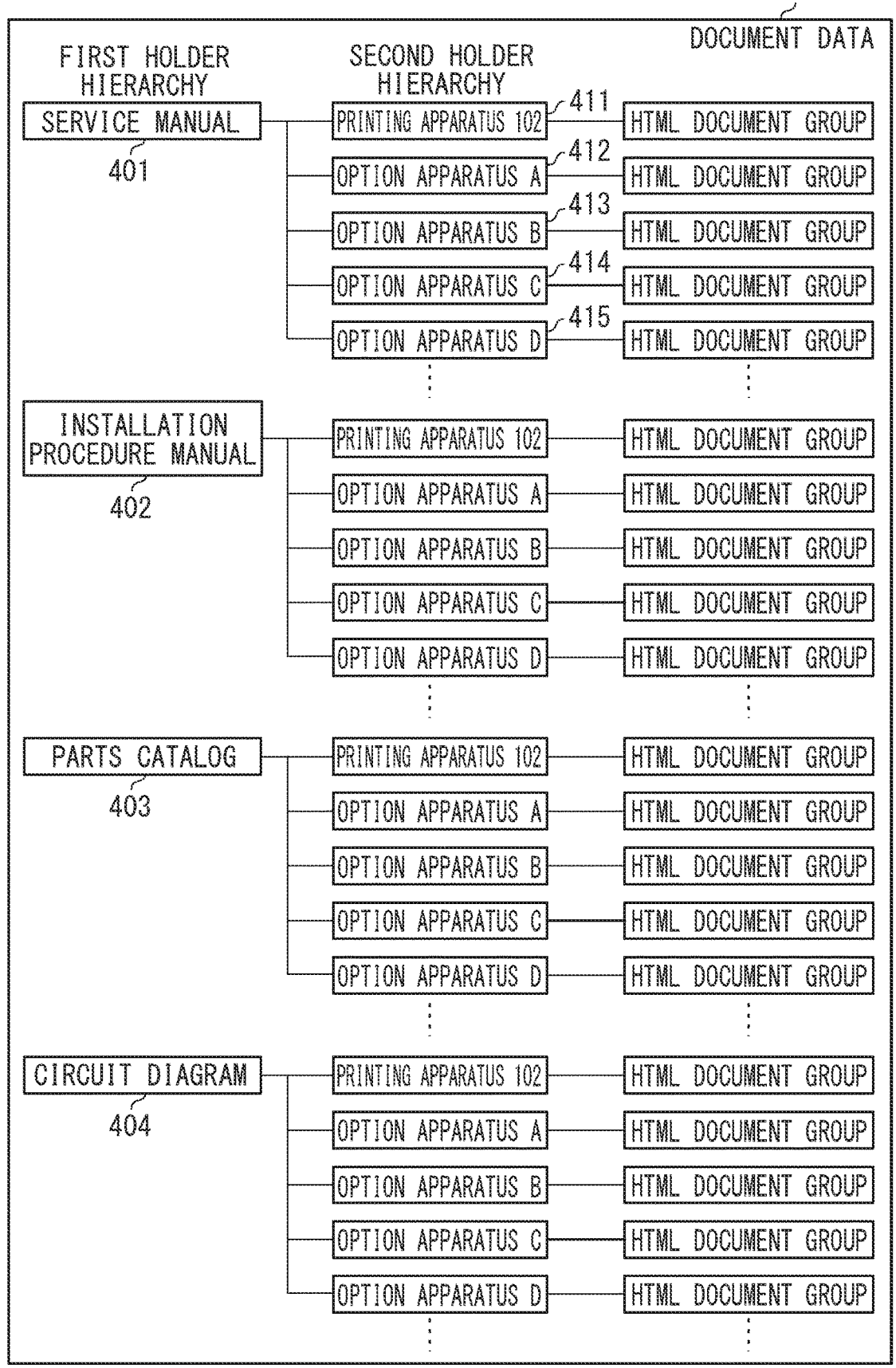
FIG. 4 is a block diagram illustrating an example of a configuration of the electronic document according to the first exemplary embodiment.

As illustrated in FIG. 4, the plurality of types of document data includes document data about the printing apparatus 102 and document data about the option apparatuses connectable to the printing apparatus 102.

The printing apparatus 102 determines, when it executes the search program 313 to present an HTML document matching a search condition from the electronic document 410, a folder to be searched for in the electronic document 410 according to the option apparatus connected thereto. Processing for this determination will be described below with reference to FIGS. 5 and 6.

A flowchart of FIG. 5 illustrates a flow of initialization processing for the option apparatuses connected to the printing apparatus 102, which is performed when the printing apparatus 102 is started up. The processing (procedure) illustrated in FIG. 5 is implemented by the CPU 134 loading and executing a program stored in the HDD 135 or a storage unit (not illustrated). Alternatively, a part or the whole of the processing illustrated in FIG. 5 may be performed by hardware.

First, in step S501, the CPU 134 transmits a communication start command to the option apparatuses connected to the printing apparatus 102. The communication start command is a command interpretable by each of the option apparatuses, and is transmitted to each of the option apparatuses via the communication cable 240. The option apparatus, which has received the communication start command, feeds a response signal to the printing apparatus 102.

In step S502, the CPU 134 then receives a response signal from the option apparatus corresponding to the communication start command transmitted in step S501. The printing apparatus 102 acquires the response signals respectively from the option apparatuses via the first connection port 137 and the second connection port 138. The response signal includes identification (ID) information about a device that has made the response. The device ID information is identification information for identifying the type of the option apparatus connected to the printing apparatus 102.

In step S503, the CPU 134 then specifies the option apparatus connected to the printing apparatus 102 from the device ID information included in the response signal. In the present exemplary embodiment, the device ID information includes information representing the type of the option apparatus and a serial number. The CPU 134 can specify the option apparatus that is connected to the printing apparatus 102 by referring to the device ID information.

In step S504, the CPU 134 then creates a search folder list based on the option apparatus that has been specified in step S503. In the present exemplary embodiment, the search folder list is a list representing the folders to be searched among the plurality of folders included in the electronic document 410. In the example illustrated in FIG. 4, as the folders to be searched among the folders listed in the second folder hierarchy, the folder (e.g., the folder 411) corresponding to the printing apparatus 102 and the folder corresponding to the option apparatus, which has been specified in step S503, are selected.

If it is specified that the option apparatus A is connected to the printing apparatus 102 in step S503, for example, the folder 412 corresponding to the option apparatus A is selected as the folder to be searched. The search folder list will be further described with reference to FIG. 6. The created search folder list is stored in the HDD 135.

In this way, the CPU 134 determines a search range, in which a keyword designated by a search instruction is to be searched for, in the electronic document 410 stored in the HDD 135 based on configuration information about the printing apparatus 102. In the present exemplary embodiment, the CPU 134 determines that the document data used to perform maintenance of the option apparatus of the type not corresponding to the device ID information acquired by the CPU 134 among the document data stored in the HDD 135 is not included in the search range.

In step S505, the CPU 134 transmits a previously determined initialization command to each of the option apparatuses connected to the printing apparatus 102, and ends a series of processing. The initialization command is a command for making a setting of each of the option apparatuses to perform an operation adapted to the printing apparatus 102. For example, setting value information set with the initialization command includes setting value information about a sheet conveyance speed and a sheet passing timing. The option apparatus, which has received the initialization command, makes an operation setting of the option apparatus itself based on a received setting value.

For example, the processing described with reference to FIG. 5 can be performed when the printing apparatus 102 is restarted due to a configuration change of the option apparatuses connected to the printing apparatus 102. However, it is not limited there to, and the processing illustrated in FIG. 5 may be performed in a case where the printing apparatus 102 has issued an instruction to initialize the option apparatus connected thereto after being started up. In this way, the search folder list can be updated according to the configuration change of the option apparatuses.

An example of the above described search folder list will be described below with reference to FIG. 6. FIG. 6 is a schematic view illustrating an example of the search folder list that has been created in step S504.

A search folder list 600 and a search folder list 601 respectively represent search folder lists described in an Extensible Markup Language (XML) format. In an example illustrated in FIG. 6, a relative path of a folder to be searched is described behind a path tag. The search folder list 600 represents a search folder list obtained when the option apparatuses A, B, C, and D are connected to the printing apparatus 102. The search folder list 601 represents a search folder list obtained when the option apparatuses A and D are connected to the printing apparatus 102.

Figure 8:
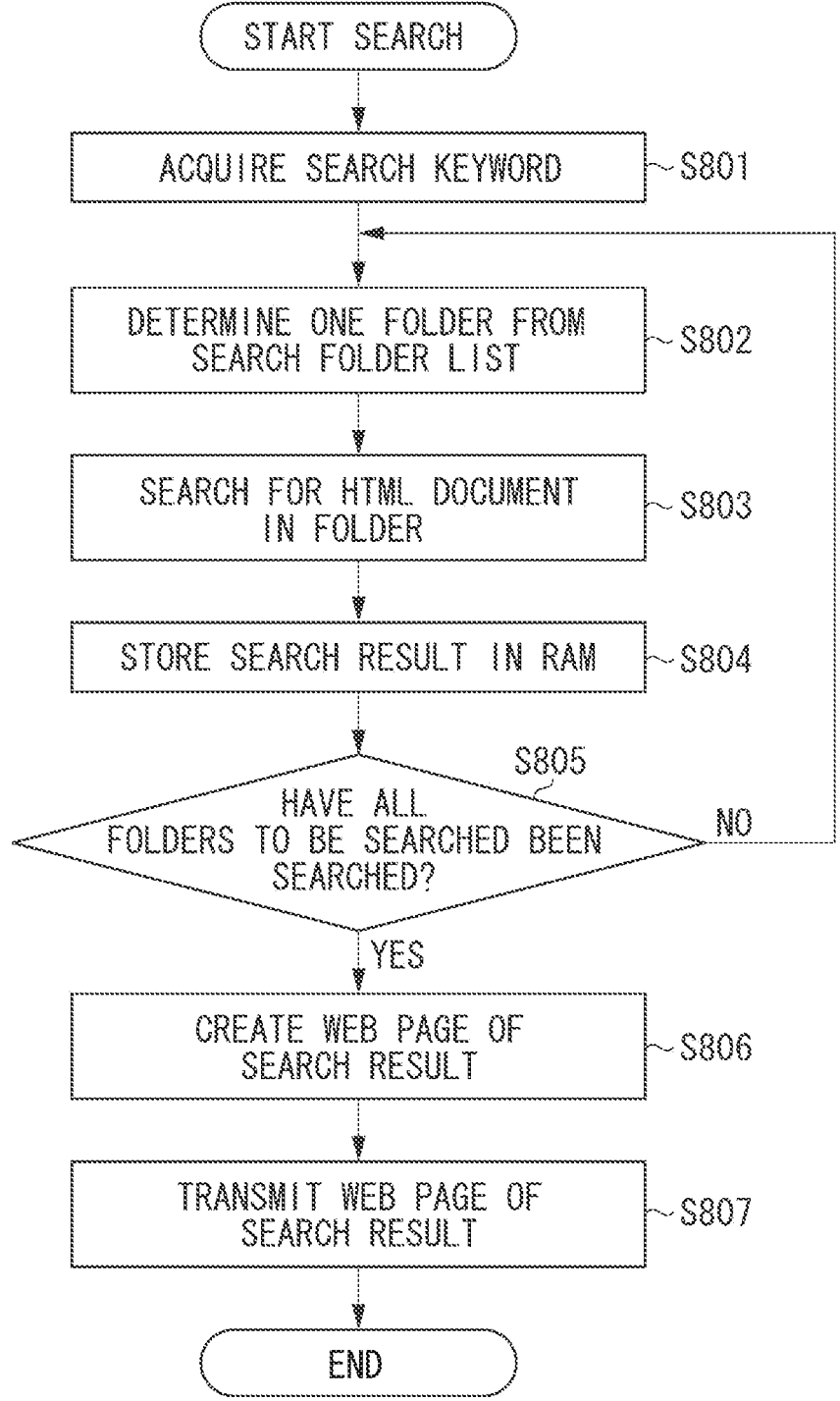
FIG. 8 is a flowchart illustrating search processing of the printing apparatus according to the first exemplary embodiment.

Next, an operation performed when the printing apparatus 102 performs a search using the above-described search folder lists will be described below with reference to FIGS. 7 to 9.

A display manner of the electronic document 410 will be described using an example illustrated in FIG. 7. The display illustrated in FIG. 7 is performed on a display device connected to the DFE 101. Alternatively, the display may be performed on a display panel of the printing apparatus 102. In the present exemplary embodiment, the web browser 303 accesses the electronic document 410 stored in the HDD 135 in the printing apparatus 102 to implement the display illustrated in FIG. 7.

A web page 700 represents an entire image displayed on the web browser 303, and is displayed on the operation unit 117 by the CPU 113. The example illustrated in FIG. 7 indicates how a menu of a service document relating to the printing apparatus 102 is displayed. The web page 700 is displayed by accessing a previously determined address (e.g., index.html placed in the highest hierarchy of the electronic document 410) from the web browser 303.

Buttons 701 to 704 are buttons for selecting the type of a document to be displayed on the web browser 303. Each of the buttons 701 to 704 includes a link to a folder storing the document of a type corresponding to a button. When any of the buttons 701 to 704 is pressed, a screen for selecting the second folder hierarchy illustrated in FIG. 4 is displayed. A box 710 is a text input area to which a search keyword is to be input. A button 711 is a search button for inputting an instruction to start searching. When the button 711 is pressed, the web browser 303 sends a search request message, as described below, to the web server 302. A search request message sent when "drum cleaning" is designated as a search keyword is taken as an example.
http://host_name/servicedocuments/
search.cgi?keyword="dry cleaning"

In the search request message, "http://host_name/service-documents/search.cgi" is a portion where a CGI program for performing a search (the search program 313 illustrated in FIG. 3) is to be designated, and "keyword="drum cleaning"" is a parameter portion representing a search keyword.

Next, an operation of the CPU 134 performed when the web server 302 has received the search request message from the web browser 303 will be described below with reference to a flowchart of FIG. 8. The processing illustrated in FIG. 8 is implemented by the CPU 134 loading and executing a program stored in the HDD 135 or a storage unit (not illustrated). Alternatively, a part or the whole of the processing illustrated in FIG. 8 may be performed by hardware.

First, in step S801, the CPU 134 acquires a search keyword from a parameter included in the search request message requested from the web browser 303. In this way, the CPU 134 receives a keyword search instruction in the electronic document 410 stored in the HDD 135. The CPU 134 executes the search program 313 to perform the following processing when it acquires a search keyword.

In step S802, the CPU 134 refers to a search folder list stored in the HDD 135, to determine one folder which has not yet been searched.

In step S803, the CPU 134 then performs a search using the search keyword, which has been acquired in step S801, for an HTML document included in the folder determined in step S802.

In step S804, the CPU 134 then stores a result of the search, which has been performed in step S803, in the RAM 133. The search result includes a document name of the HTML document hit in a keyword search, a name of the folder including the HTML document, and text information in the vicinity of a hit portion.

In step S805, the CPU 134 then determines whether all folders listed in the search folder list stored in the HDD 135 have been searched. If all the folders have been searched (YES in step S805), the processing proceeds to step S806. If all the folders have not been searched (NO in step S805), the processing returns to step S802.

In step S806, the CPU 134 reads out the search result from the RAM 133 and creates a web page in the HTML format, and the processing proceeds to step S807. Details of the web page serving as the search result will be described with reference to FIG. 9.

In step S807, the CPU 134 transmits the web page, which has been created in step S806, to the DFE 101, and ends the series of processing. The DFE 101, which has received the web page serving as the search result, displays the received web page on the web browser 303.

The web page to be transmitted to the DFE 101 includes link information for the CPU 134 to access document data including a keyword. In this way, the CPU 134 can display the search result on the display device connected to the DFE 101.

As described above, the CPU 134 can detect the document data including the keyword included in the search range determined in the processing illustrated in FIG. 5 in the electronic document 410 stored in the HDD 135 and has been designated by the search instruction. Thus, the CPU 134 performs display control to display a detection result on the web browser 303.

An example of a search result displayed on a screen of the web browser 303 will be described below with reference to FIG. 9. A web page 900 represents an entire web page displayed on the web browser 303, and is displayed on the operation unit 117 by the CPU 113. A list 910 is a search result list in which search hit cases are list-displayed. In the list 910, additional information as indicated by columns 911 to 913, corresponding to the respective search hit cases are presented for an operator.

The column 911 represents a folder name including an HTML document hit by a keyword search. The column 912 represents a document name of the HTML document hit in the keyword search. The column 913 represents text information in the vicinity of a portion hit in the keyword search. The operator can narrow portions desired to be referred to in the search hit case based on the information. If the number of search hit cases to be displayed is larger than the number of cases that can be displayed at a time in the list 910, a scroll bar 914 is used. The operator can refer to any search hit cases by operating the scroll bar 914.

The above described printing system enables, when a search is performed in a system capable of browsing electronic documents held in the printing apparatus 102, the electronic document corresponding to the option apparatus, which has not been connected to the printing apparatus 102, to be excluded from a search target. In this way, an item desired by the user can be efficiently detected from electronic data representing an operation procedure or the like of the printing apparatus 102. According to the present exemplary embodiment, a period of time required for search processing is shortened, and an unnecessary search hit is suppressed. Thus, the user can quickly reach the desired electronic document. Therefore, convenience for the user is improved. A range serving as a search processing target can be narrowed. Therefore, a processing load on the printing apparatus 102 can be reduced.

In the first exemplary embodiment, the example in which the electronic document to be searched is determined according to the configuration of the option apparatuses connected to the printing apparatus has been described. However, there are items to be desirably considered when a search target range is determined in addition to the presence or absence of connection of the option apparatuses. A license function is an example. The license function is a function that cannot be used in an initial state of an apparatus but becomes usable when a user purchases and validates a license. By excluding documents for which a license function has not been validated from a search target, a search can be further increased in speed, and an unnecessary search hit can be suppressed.

Therefore, in a second exemplary embodiment, an example in which a document to be searched for is determined according to a validation status of a license function. It is determined whether a document is to be searched for in units of folders in which electronic documents are stored, according to the first exemplary embodiment. However, in the second exemplary embodiment, an example in which it is determined whether each of HTML documents is to be searched for will be described. In the present exemplary embodiment, only components different from those in the first exemplary embodiment will be described, and components having the same configurations as those in the first exemplary embodiment will be described using the same reference numerals. A schematic hardware configuration of a printing system according to the second exemplary embodiment is similar to that described in FIG. 1 in the first exemplary embodiment.

An example of a table used for a printing apparatus 102 to manage a validation status of a license will be described with reference to FIG. 10. In the present exemplary embodiment, the table illustrated in FIG. 10 is referred to as a license management table.

A column 1001 represents a name of each of license functions. A column 1002 represents a license identifier (ID) serving as a specific identifier for identifying each of the license functions. A column 1003 indicates whether each of the license functions has been validated. In FIG. 10, a case where the license function is validated is written as "valid", and a case where the license function is not validated is written as "invalid". An example of the validation of the license is a method for validating a license by inputting a license code issued when a user has purchased the license to the printing apparatus 102. Another example is a method for validating a license by uploading an electronic file containing license information provided from a printing apparatus vendor into the printing apparatus 102 via a network. The table is updated by a CPU 134 when the table is stored in a storage device such as a HDD 135 in the printing apparatus 102 and a license status has changed.

The CPU 134 refers to the table illustrated in FIG. 10 to determine a search range, and acquires functional information for specifying, among a plurality of functions of the printing apparatus 102, the validated functions as configuration information about the printing apparatus 102.

A configuration of an electronic document 410 in the second exemplary embodiment is similar to that illustrated in FIG. 4 in the first exemplary embodiment. The second exemplary embodiment differs from the first exemplary embodiment in that when an HTML document corresponds to a specific license function, information for designating a license ID representing the license function is embedded as an HTML meta tag (hereinbelow referred to as a meta tag).

FIG. 11 is a schematic view illustrates an example of an HTML document corresponding to a specific license function. An HTML document 1100 represents an entire document described in an HTML format. In the HTML document 1100, a portion <meta name="licenseID" content="FAX"> is a meta tag, where "name="license ID"" indicates that the meta tag designates a license ID, and "content="FAX"" is a portion which designates the license ID. An example in which "FAX" is designated as the license ID is illustrated. In the present exemplary embodiment, the electronic document 410 includes a plurality of HTML documents, as illustrated in FIG. 11.

Thus, the HDD 135 according to the present exemplary embodiment stores a plurality of document data used to perform maintenance of the printing apparatus 102 respectively in association with functions of the printing apparatus 102.

Figure 12:
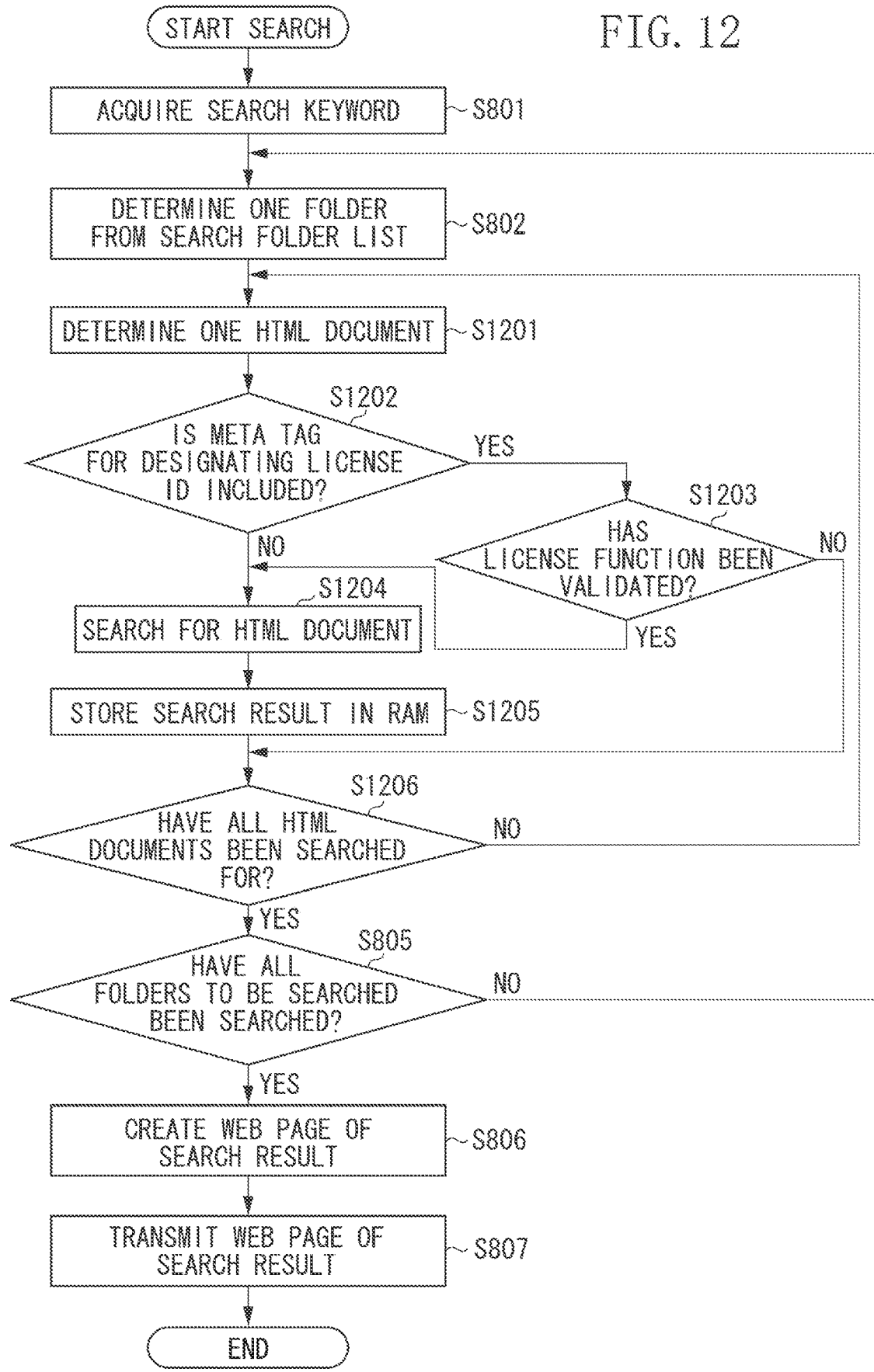
FIG. 12 is a flowchart illustrating search processing of a printing apparatus according to the second exemplary embodiment.

FIG. 12 is a flowchart illustrating an operation of the CPU 134 performed when a web server 302 has received a search request message from a web browser 303 in the second exemplary embodiment. Processing illustrated in FIG. 12 is implemented by the CPU 134 loading and executing a program stored in the HDD 135 or a storage unit (not illustrated). Alternatively, a part or the whole of the processing illustrated in FIG. 12 may be performed by hardware. In FIG. 12, steps in which similar processing to that in steps described in FIG. 8 is performed are respectively assigned the same step numbers, and description thereof is not repeated.

After step S802 ends, the processing proceeds to step S1201. In step S1201, the CPU 134 determines, from HTML documents included in the folder determined in step S802, the one HTML document that has not yet been searched for.

Next, in step S1202, the CPU 134 determines whether the HTML document, which has been determined in step S1201, includes a meta tag for designating a license ID. If the HTML document includes the meta tag for designating the license ID (YES in step S1202), the processing proceeds to step S1203. If the HTML document does not include the meta tag for designating the license ID (NO in step S1202), the processing proceeds to step S1204.

In step S1203, the CPU 134 refers to a license management table, and determines whether a license function corresponding to the license ID designated by the meta tag included in the HTML document, which has been determined in step S1201, has been validated. If the license function has been validated (YES in step S1203), the processing proceeds to step S1204. If the license function has not been validated (NO in step S1203), search processing is not performed, and the processing proceeds to step S1206.

In this way, the CPU 134 determines that, among a plurality of document data stored in the HDD 135, the document data associated with the license function, which has not been validated in the printing apparatus 102, is not included in a search range.

In step S1204, the CPU 134 perform a search using a keyword, which has been acquired in step S801, for the HTML document determined in step S1201, and the processing proceeds to step S1205.

In step S1205, the CPU 134 stores a result of the search, which has been performed in step S1204, in a RAM 133, and the processing proceeds to step S1206. Information included in the search result is similar to that in the first exemplary embodiment, and description thereof is not repeated.

In step S1206, the CPU 134 determines whether all the HTML documents included in the folder determined in step S802 have been searched for. If all the HTML documents have been searched for (YES in step S1206), the processing proceeds to step S805. If all the HTML documents have not been searched for (NO in step S1206), the processing returns to step S1201.

In the second exemplary embodiment, it is determined whether each of the HTML documents is to be searched for using the meta tag included in the HTML document. However, the HTML document may be further divided into sections, to determine whether the HTML document is to be searched for in unit of section.

The above-described printing system enables, when a search is performed in a system capable of browsing electronic documents held in the printing apparatus 102, the electronic document corresponding to a license function that has not been validated to be excluded from a search target. Thus, an item desired by the user can be efficiently detected from electronic data representing an operation procedure of the printing apparatus 102 or the like. According to the present exemplary embodiment, a period of time required for search processing is shortened, and an unnecessary search hit is suppressed. Thus, the user can quickly reach the desired electronic document. Therefore, convenience for the user is improved. A range of a search processing target can be narrowed. Therefore, a processing load on the printing apparatus 102 can be reduced.

OTHER EMBODIMENTS

The above described first and second exemplary embodiments may be implemented in combination. Among document data in a range determined according to a configuration of the option apparatuses connected to the printing apparatus 102, only the document data about a validated license function may be searched for.

Although a configuration in which an electronic document is referred to and searched using the web browser 303 on the DFE 101 has been described in the above exemplary embodiments, this is merely one example. The aspect of the embodiments is also applicable even if another client terminal having a web browser is used.

Although an example in which an electronic document to be searched is determined according to a configuration of an option apparatuses or a validation status of a license function has been described in the above described exemplary embodiments, this is merely one example. The aspect of the embodiments is not limited to such apparatus configurations. For example, an electronic document to be searched can also be easily determined according to apparatus configurations such as a model (a printing speed, a destination, etc.) of a printing apparatus, a version of installed firmware, and the type of a DFE to be connected.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-249066, filed Dec. 21, 2015, which is hereby incorporated by reference herein in its entirety.

What is claimed is:

1. An image forming apparatus comprising:
a storage device configured to store document data used to perform maintenance of the image forming apparatus and document data used to perform maintenance of each option apparatus connectable to the image forming apparatus;
a memory device that stores a set of instructions; and
at least one processor that executes the instructions to:
acquire configuration information representing a configuration of the image forming apparatus, the configuration information being identification information for identifying a type of each of one or more option apparatuses connected to the image forming apparatus, determine, based on the acquired configuration information, a search range corresponding to directories that include at least one directory for the document data related to the image forming apparatus and at least one directory for the document data related to the one or more option apparatuses connected to the image forming apparatus, wherein the determined search range does not include any directory inside the storage device for the document data related to one or more option apparatuses connectable to but not connected to the image forming apparatus, receive a search instruction including a predetermined condition for search processing, perform the search processing, based on the predetermined condition, on only the directories corresponding to the determined search range in the storage device, create a result page including data satisfying the predetermined condition as a result of the search processing, and provide the created result page.

2. The image forming apparatus according to claim 1, wherein the document data stored in the storage device includes a plurality of data different in types, each of the plurality of data including data about the image forming apparatus and data about the each option apparatus connectable to the image forming apparatus.

3. The image forming apparatus according to claim 1, wherein the document data stored in the storage device includes data about at least one of a service manual used to confirm a procedure for performing maintenance of the image forming apparatus, an installation procedure manual used to confirm a procedure for installing the image forming apparatus, a part catalog used to confirm information about parts in the image forming apparatus, and a circuit diagram used to confirm a circuit included in the image forming apparatus.

4. The image forming apparatus according to claim 1, wherein the document data stored in the storage device is a web document, and can be browsed using a web browser from another apparatus connected to the image forming apparatus via a network.

5. The image forming apparatus according to claim 1, wherein the one or more option apparatuses include at least one of a sheet feeding apparatus, a printed-sheets-loading-apparatus, and a printed-sheets-processing-apparatus.

6. A method for controlling an image forming apparatus and document data used to perform maintenance of each option apparatus connectable to the image forming apparatus, comprising:

acquiring configuration information representing a configuration of the image forming apparatus, the configuration information being identification information for identifying a type of each of one or more option apparatuses connected to the image forming apparatus;

determining, based on the acquired configuration information, a search range corresponding to directories that include at least one directory for the document data related to the image forming apparatus and at least one directory for the document data related to the one or more option apparatuses connected to the image forming apparatus, wherein the determined search range does not include any directory inside the storage device for the document data related to one or more option apparatuses connectable to but not connected to the image forming apparatus;

receiving a search instruction including a predetermined condition for search processing;

performing the search processing, based on the predetermined condition, on only the directories corresponding to the determined search range in a storage device;

creating a result page including data satisfying the predetermined condition as a result of the search processing; and providing the created result page.

7. The control method according to claim 6, wherein the document data includes a plurality of data different in types, each of the plurality of data including data about the image forming apparatus and data about the each option apparatus.

8. The control method according to claim 6, wherein the document includes data about at least one of a service manual used to confirm a procedure for performing maintenance of the image forming apparatus, an installation procedure manual used to confirm a procedure for installing the image forming apparatus, a part catalog used to confirm information about parts in the image forming apparatus, and a circuit diagram used to confirm a circuit included in the image forming apparatus.

9. The method according to claim 6, wherein the document data is a web document, and can be browsed using a web browser from another apparatus connected to the image forming apparatus via a network.

10. A non-transitory computer-readable storage medium storing a program for causing an image forming apparatus and document data used to perform maintenance of each option apparatus connectable to the image forming apparatus to execute a method, the method comprising:

acquiring configuration information representing a configuration of the image forming apparatus, the configuration information being identification information for identifying a type of each of one or more option apparatuses connected to the image forming apparatus;

determining, based on the acquired configuration information, a search range corresponding to directories that include at least one directory for the document data related to the image forming apparatus and at least one directory for the document data related to the one or more option apparatuses connected to the image forming apparatus, wherein the determined search range does not include any directory inside the storage device for the document data related to one or more option apparatuses connectable to but not connected to the image forming apparatus;

receiving a search instruction including a predetermined condition for search processing;

performing the search processing, based on the predetermined condition, on only the directories corresponding to the determined search range in a storage device;

creating a result page including data satisfying the predetermined condition as a result of the search processing; and providing the created result page.

11. The non-transitory computer-readable storage medium according to claim 10, wherein the document data includes a plurality of data different in types, each of the plurality of data including data about the image forming apparatus and data about the each option apparatus connectable to the image forming apparatus.

12. The non-transitory computer-readable storage medium according to claim 10, wherein the document includes data about at least one of a service manual used to confirm a procedure for performing maintenance of the apparatus, an installation procedure manual used to confirm a procedure for installing the apparatus, a part catalog used to confirm information about parts in the apparatus, and a circuit diagram used to confirm a circuit included in the apparatus.

\* \* \* \* \*